June 5, 1923.

W. B. McMASTERS

HEADLIGHT LENS

Filed Jan. 12, 1921

Inventor
W. B. McMasters.
By H. E. Dunlap
Attorney.

June 5, 1923.

W. B. McMASTERS

HEADLIGHT LENS

Filed Jan. 12, 1921

Inventor
W. B. McMasters.
By N. E. Dunlap
Attorney.

Patented June 5, 1923.

1,457,980

UNITED STATES PATENT OFFICE.

WALTER B. McMASTERS, OF WHEELING, WEST VIRGINIA.

HEADLIGHT LENS.

Application filed January 12, 1921. Serial No. 436,757.

*To all whom it may concern:*

Be it known that I, WALTER B. McMASTERS, a citizen of the United States of America, and resident of Wheeling, county of Ohio, and State of West Virginia, have invented certain new and useful Improvements in Headlight Lenses, of which the following is a specification.

This invention relates to a glass lens for vehicle-headlights, and it has for its primary object to provide a lens which will so distribute the rays of light emanating from an adjacent light source or reflected by an adjacent reflector that practically all such rays are effectively utilized either for illuminating the roadway throughout a considerable distance from a point immediately in front of the headlight, or for illuminating ditches, sidewalks and objects located laterally of and bordering the roadway, resulting in a minimum waste of light rays and in effectual elimination of the blinding glare which is so objectionable to persons facing headlights in which ordinary, or plain glass, lenses are used.

A further object is to provide a headlight lens by which practically all the rays of light are directed in a vertically confined path along the roadway, producing a substantially flat horizontal sheet of light which is evenly spread over the entire roadway, and including liberal illumination of the edges of the latter to the extent that crossroads, lanes and curves, as well as objects bordering the roadway and approached by the vehicle, are included within the range of effective illumination.

A still further object is to provide a lens by which rays of light passing therethrough are distributed in such manner that their intrinsic brilliancy is reduced to the extent that all tendency to produce a dazzling glare is prevented without material sacrifice of efficient road illumination.

With these and other important objects in view, the invention resides in the features of construction and arrangement which will hereinafter be fully described, reference being had to the accompanying drawings, in which—

The lens embodying my invention is of flat circular form adapted for mounting in a headlight having a parabolic reflector, as ordinarily. The front surface of the lens is perfectly plain and smooth, while the rear face is grooved or channeled throughout to form a multitude of vertically disposed prisms of diminutive width. It has been ascertained that highly satisfactory results are obtained by the use of a size or width of prism in which approximately twenty prisms are employed to the inch.

Figure 1:
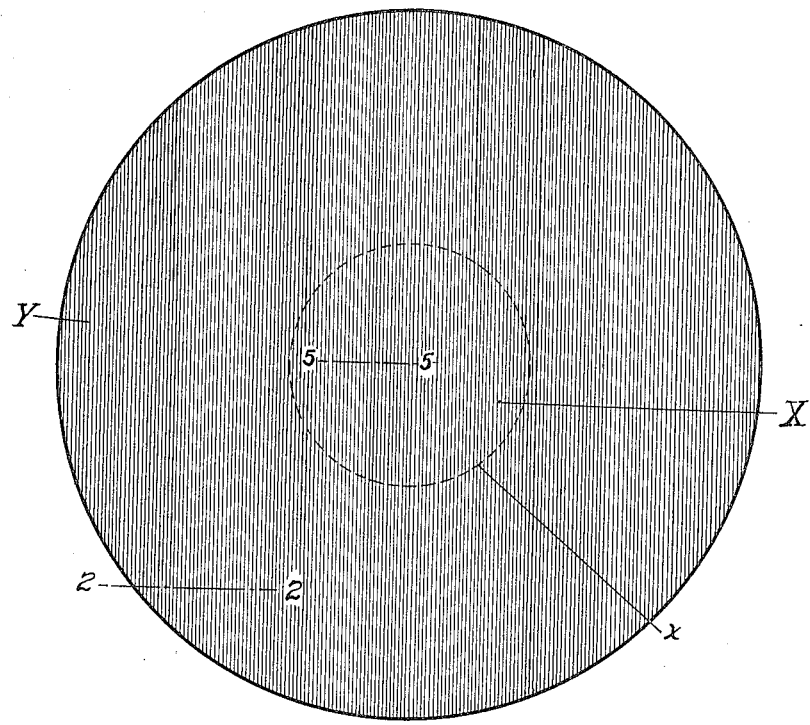
Figure 1 is an inner, or rear, face view of the invention.
Figure 2:
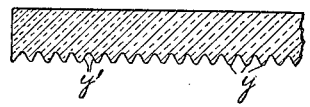
Figure 2 is an enlarged section on line 2—2, Fig. 1.
Figure 5:
Figure 5 is a similar enlarged section on line 5—5, Fig. 1.

The prisms may obviously be of uniform shape throughout the entire area of the lens, but, for reasons which will hereinafter be explained, it is preferred that a central area, as the area X circumscribed by the circular dotted line $x$ in Fig. 1, shall have the prisms thereof of approximately true triangular, or saw-tooth, form, as shown in Fig. 5, while the surrounding area Y shall have the prisms thereof shaped to present convexly curved edges or apexes, with the intermediate grooves or channels concavely curved, as shown in Fig. 2. This arrangement of prisms of different cross section in the different areas is designed to meet certain requirements presented through the use of a parabolic reflector. Such a reflector, while ideal for concentrating and directing light in the form of a strong central shaft or beam for long-distance road illumination, is productive of certain highly objectionable results, chief among which may be mentioned that the lateral illumination of the roadway is inadequate and that a glare of brilliant and dazzling intensity is presented to the eyes of persons facing the reflector. The production of this central glaring beam of maximum intensity is due to the fact that a relatively small central area of the reflector catches and reflects horizontally therefrom a very large proportion of the light rays emanating from a lamp disposed in properly focused relation thereto. The relatively much greater reflector area located outside said central area not only catches a greatly reduced number of the rays, but the latter are distributed thereover in such manner that the intensity of the light rapidly diminishes outward from said central area.

Figure 3:
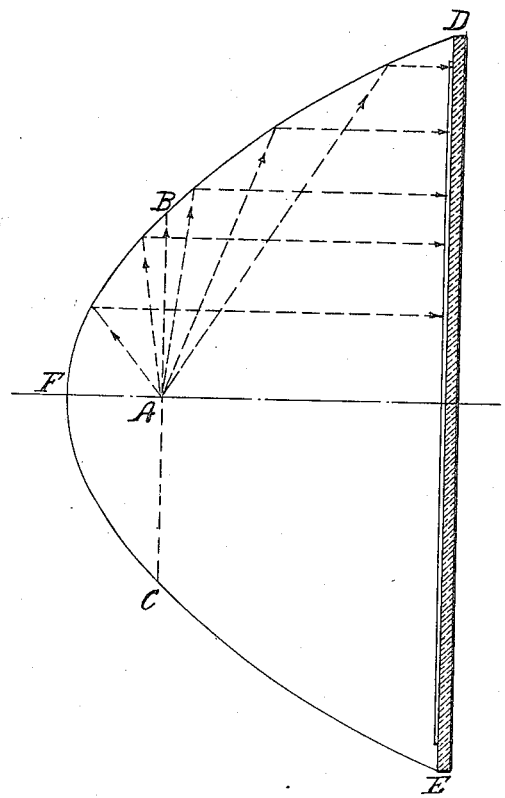
Figure 3 is a diagrammatic view of a parabolic reflector of the character commonly employed in vehicle headlights, showing the improved lens in vertical section applied thereto.

To illustrate: The line DBFCE, Fig. 3, represents the parabolic curve of a reflector, and A indicates the focal point at which would be positioned the short filament of a nitrogen lamp located in properly focused relation to the reflector. Since the rays of light from such a lamp would be evenly distributed over the interior surface of a hollow sphere in which it occupies the center, it is evident that one half the light rays emanating from a lamp located at the focal point A are caught and reflected by the central area BFC of the reflector, said area being located rearward of a vertical line intersecting said focal point, and also that a relatively small proportion of the remaining one half impinges upon the relatively large area of the reflector surrounding said central area. Now, assuming that the distance from A to D is five inches and that a sphere is produced with AD as a radius: the area of such sphere is approximately 314 square inches. Hence, for convenience, we will assume that the lamp is giving off 314 units of light. A small part of this total, or approximately 50 units, represented by a little more than the plane area of a lens of the diameter DE, are not caught by the reflector, but pass directly outward from the lamp. Thus, the reflector does catch 314 minus 50, or 264 units; and, since the central area BFC receives one half of the total light units, or 157, it becomes apparent that but 107 units, or slightly more than one third of the total, are handled by the relatively large reflector area located outside said central area. Noting that, as herein shown, the diameter BC of said central area is substantially one half the diameter DE of the opening in the reflector, and that, therefore, an equal area of the central portion of the lens through which the rays are reflected horizontally from said central area BFC has a diameter approximating one half that of said lens, it is evident that said central lens area has an area about one fourth that of the entire lens. From this it follows that, considering the intrinsic brilliancy of the central lens area as represented by the number of light units intercepted thereby—that is, 157—the intrinsic brilliancy of the remainder of the lens is 107 divided by 3, or about 36. Thus, an average intrinsic brilliancy more than four times as great as that of the surrounding lens area is possessed by said central lens area.

To redirect and distribute the highly concentrated rays passing through the central lens area to the extent that objectionable blinding glare is obviated and so that said rays will serve a useful purpose, it is contemplated that prisms of approximately true isosceles triangle form, as shown in Fig. 5, shall be employed throughout said area, or at least throughout the greater portion thereof. Such prisms, theoretically considered, would direct all rays impinging thereon in opposite lateral directions so that the roadsides and objects bordering the roadway would be more or less brilliantly illuminated, and would direct no light in a forward direction. However, since it is practically impossible to construct a lens in which the diminutive prisms are of absolutely true triangular form, it is evident that a considerable amount of light will not be refracted laterally thereby, but will be scattered more or less in a forward direction. Further, it is preferred that the central lens area X bearing said prisms shall have a diameter somewhat less than that of the area which receives reflected rays from the central reflector area BFC, so that a circle of relatively stronger or more intense light is projected forward, thus obviating any tendency to produce a dark spot at or in said central lens area, but without creating such a concentration of rays as would result in the production of a blinding glare.

The triangular prisms referred to might be extended downward from said central lens area X to or toward the lower edge of the lens for the purpose of refracting laterally those rays which, resulting from improper focusing, frequently tend to create a bright spot or glare-producing area at the bottom part of the headlight.

Figure 4:
Figures 4 and 6 are enlarged sectional views similar to Fig. 2, showing modified forms of prisms or fillets; and—
Figure 6:

In order that there shall be adequate illumination of the roadway throughout a long distance in front of the vehicle, the prisms $y$ of the outer lens area have the form of fillets with rounded or convexly curved edges or apexes, and the intermediate grooves or flutes have rounded or concavely curved form. These prisms may either have flattened sides intermediate the curves at the tops and bases thereof, as shown at $y'$ in Fig. 2, thereby providing for lateral refraction of a considerable amount of the light passing therethrough, or they may be more or less flattened between said form and the flattened sine curvature shown at $y''$ in Fig. 4, as when a more nearly uniform distribution of light is desired. Or, the form may be still further variously modified, as indicated at $y'''$, for example, in Fig. 6. As is apparent, the greater the degree of flatness or bluntness of the prisms, the greater will be the volume of light projected in a forward direction along the roadway and the less will be the distribution of light in lateral directions. In practice, it has been found that the form of prisms and intermediate grooves productive of best results in the lens area Y is that in which the formation or outline of a continuous sine curve is presented, whereby an even distribution of light throughout the entire arc of illumination is produced. Such convex prisms of extremely limited width, while functioning to project considerable light forward, do not individually act upon a sufficient volume of rays to render the character thereof objectionable.

While a few vertical prisms of large size formed on the lens would serve to direct and distribute light in a horizontal plane in substantially the same manner as the numerous small ones which I use, the latter are employed to obtain low intrinsic brilliancy. In other words, a relatively minute volume of light is intercepted by each prism when the latter are spaced in the preferred manner—that is, about 20 to the inch— and this volume is distributed throughout a wide arc of illumination. Consequently, the effect produced upon the eye of a person facing the lens is identical with that produced by a lamp of actual low intrinsic brilliancy.

From the foregoing it will be observed, first, that I employ a large number of extremely small prisms rather than a few large ones to reduce the intrinsic brilliancy of the light to a point in which practically all glare is eliminated; second, that I arrange said prisms vertically to direct the light throughout a substantially horizontal sheet-like plane in which it is effectively utilized; third, that I accomplish the spreading of a sufficient volume of the light for distance illumination by curving the prisms to the extent required for proper distribution of the light rays; and, fourth, that I employ at at least one certain area of the lens, a different form of prism by means of which disconcerting gleaming rays of light which otherwise would be emitted in said area are redirected and distributed for effective lateral illumination of the roadway and are thereby rendered unobtrusive to the eyes of persons facing the headlight.

What is claimed is—

1. A headlight lens having one face prismed vertically, the prisms being of diminutive width and correspondingly numerous, the outer lens area thereof having the prisms thereof formed with blunt apexes and the central area having sharper apexes.

2. A headlight lens having one face prismed vertically, the prisms being of diminutive width and correspondingly numerous, a central area having the prisms thereof of angular form and the surrounding area having the prisms thereof provided with blunt apexes, said prisms being of isosceles form.

In testimony whereof, I affix my signature in presence of a subscribing witness.

WALTER B. McMASTERS.

Witness:
H. E. DUNLAP.